US008930455B2

(12) United States Patent
Kan et al.

(10) Patent No.: US 8,930,455 B2
(45) Date of Patent: Jan. 6, 2015

(54) POWER OUTAGE DETECTION SYSTEM FOR SMART GRID USING FINITE STATE MACHINES

(75) Inventors: Daniel Kan, Redwood City, CA (US); Harleen Serai, Redwood City, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 244 days.

(21) Appl. No.: 13/334,210

(22) Filed: Dec. 22, 2011

(65) Prior Publication Data

US 2013/0166641 A1    Jun. 27, 2013

(51) Int. Cl.
*G06F 15/16* (2006.01)

(52) U.S. Cl.
USPC ............... 709/204; 709/205; 702/58; 702/60

(58) Field of Classification Search
CPC ................................... G06F 11/1441
USPC ................ 709/203–205; 702/57–58, 60–62
See application file for complete search history.

(56) References Cited

U.S. PATENT DOCUMENTS

| | | | |
|---|---|---|---|
| 3,411,140 A | | 11/1968 | Halina et al. |
| 5,345,583 A | * | 9/1994 | Davis ............................ 714/23 |
| 5,553,094 A | | 9/1996 | Johnson et al. |
| 5,568,399 A | | 10/1996 | Sumic |
| 5,673,252 A | | 9/1997 | Johnson et al. |
| 5,951,686 A | * | 9/1999 | McLaughlin et al. ............ 713/2 |
| 6,195,018 B1 | | 2/2001 | Ragle et al. |
| 6,362,745 B1 | | 3/2002 | Davis |
| 6,392,996 B1 | | 5/2002 | Hjalmtysson |
| 6,424,248 B1 | | 7/2002 | Toms et al. |
| 6,492,910 B1 | | 12/2002 | Ragle et al. |
| 6,590,928 B1 | | 7/2003 | Haartsen |
| 7,227,462 B2 | | 6/2007 | Spencer |
| 7,290,037 B2 | | 10/2007 | Clark et al. |
| 7,304,587 B2 | | 12/2007 | Boaz |

(Continued)

FOREIGN PATENT DOCUMENTS

| | | |
|---|---|---|
| EP | 0493964 | 7/1992 |
| TW | 200422629 | 11/2004 |

(Continued)

OTHER PUBLICATIONS

Office Action from the Mexican Patent Office for Application No. MX/a/2008/006309 dated Jun. 15, 2010 (2 pages).

(Continued)

*Primary Examiner* — Bharat N Barot
(74) *Attorney, Agent, or Firm* — Patterson & Sheridan, LLP

(57) ABSTRACT

A power outage detection system. The system includes a device configured to increment a reboot counter when the device is powered up, and to transmit a first message when the device loses power and a second message when the device is powered up, and a back office system. The first message includes the value of the reboot counter and a timestamp, and the second message includes the value of the reboot counter. The back office system includes a finite state machine configured to receive the first and second messages. The finite state machine determines if the received first message is valid using the value of the reboot counter and the timestamp, and determines if the received second message is valid using the value of the reboot counter. The finite state machine then outputs an accurate indication of the state of the device.

20 Claims, 4 Drawing Sheets

(56) References Cited

U.S. PATENT DOCUMENTS

| | | | |
|---|---|---|---|
| 7,308,370 B2 | 12/2007 | Mason, Jr. et al. | |
| 7,379,981 B2 | 5/2008 | Elliott et al. | |
| 7,394,394 B2 | 7/2008 | Lockhart et al. | |
| 7,395,444 B2* | 7/2008 | Ives | 709/203 |
| 7,827,268 B2* | 11/2010 | Monier et al. | 709/204 |
| 7,831,401 B2* | 11/2010 | Jungreis | 702/60 |
| 2002/0082748 A1 | 6/2002 | Enga et al. | |
| 2004/0024717 A1 | 2/2004 | Sneeringer | |
| 2004/0138787 A1 | 7/2004 | Ransom et al. | |
| 2004/0139038 A1 | 7/2004 | Ehlers et al. | |
| 2005/0033707 A1 | 2/2005 | Ehlers et al. | |
| 2005/0078660 A1 | 4/2005 | Wood | |
| 2006/0064485 A1 | 3/2006 | Baron et al. | |
| 2006/0168191 A1* | 7/2006 | Ives | 709/224 |
| 2006/0202854 A1 | 9/2006 | Spencer | |
| 2012/0046891 A1* | 2/2012 | Yaney et al. | 702/62 |
| 2012/0161752 A1* | 6/2012 | Spooner | 324/142 |

FOREIGN PATENT DOCUMENTS

| | | |
|---|---|---|
| TW | 200521442 | 7/2005 |
| WO | 9729466 | 8/1997 |
| WO | 2006102172 | 9/2006 |

OTHER PUBLICATIONS

Liu et al., "Integrated Fuzzy Filter for Distribution Outage Information" Oct. 28, 2002, Electric Power Systems Research, vol. 63, Issue 3 whole document, especially pp. 3 and 6.

Chow et al., "A Fast Distributed Network Restoration Algorithm", 1993 IEEE, pp. 261-267, 0-7803-0922, Jul. 1993, USA.

Sridharan et al., "Outage Management Through AMR Systems Using an Intelligent Data Filter", IEEE Transactions on Power Delivery, vol. 16, No. 4, pp. 669-675, Oct. 2001, USA.

Bicknell, C. Edward Chow and Sami Syed, "Performance Analysis of Fast Distributed Network Restoration Algorithms", 1993 IEEE, pp. 1596-1600, 0-7803-0917-0/93, USA.

Fischer et al., "A General Polling Algorithm Using a Wireless AMR System for Restoration Confirmation", IEEE Transactions on Power Systems, May 2001, pp. 312-316, vol. 16, No. 2, USA.

Document entitled "Outage Reporting Example" from Schneider Electric, publicly available prior to May 17, 2007.

Harper-Slaboszewicz, How to Improve Outage Management (UtiliPoint.com—Jan. 18, 2006), Powermarketers Industry Publications, Jan. 18, 2006, USA.

PCT/US2007/73457 International Search Report and Written Opinion, dated Mar. 14, 2008 (13 pages).

PCT/US2008/001163 International Search Report and Written Opinion, dated Nov. 26, 2008 (13 pages).

Office Action for U.S. Appl. No. 11/804,223, dated Jul. 14, 2009, (57 pages).

Search Report from the Hungarian Patent Office for Application No. 200905059-2 dated Oct. 22, 2010 (6 pages).

Yan Liu, "Distribution System Outage and Restoration Analysis Using a Wireless AMR System", 2002, IEEE, pp. 871-875.

Sioe T. Mak, "A Synergistic Approach to Using AMR and Intelligent Electronic Devices to Determine Outages in a Distribution Network", Mar. 2006, IEEE, pp. 447-453.

Search Report from the Taiwan International Patent Office for Application No. 096126011 dated Mar. 25, 2011 (English Translation, 7 pages).

Examination Report from the Hungarian Intellectual Property Office for Application No. 200905059-2 dated Jun. 14, 2011 (6 pages).

Examination Report from the Malaysian Patent Office for Application No. 20093137 dated Mar. 23, 2012 (Translation, 3 pages).

\* cited by examiner

POWER OUTAGE DETECTION SYSTEM FOR SMART GRID USING FINITE STATE MACHINES

BACKGROUND

The present invention relates to a system which monitors for smart grid power outages and restorations.

Utility companies are in the business of reliably delivering power to their customers. Currently, utility companies rely on their customers to inform them of power outages or use some high level monitoring system.

SUMMARY

Relying on customers to report power outages is error-prone and results in inherent delays in understanding the true state of power outages on the grid. Current high level monitoring systems experience adverse network conditions such as dropped, out-of-order and duplicate outage messages, and therefore cannot accurately determine power outages. The power outage detection system for smart grids accurately determines power outages and restorations for smart grid devices under adverse network conditions in which messages may be dropped, arrive out-of-order, or are duplicated using a finite state machine.

In one embodiment, the invention provides a power outage detection system. The system includes a device configured to increment a reboot counter when the device is powered up, and to transmit a first message when the device loses power and a second message when the device is powered up, and a back office system. The first message includes the value of the reboot counter and a timestamp, and the second message includes the value of the reboot counter. The back office system includes a finite state machine configured to receive the first and second messages. The finite state machine determines if the received first message is valid using the value of the reboot counter and the timestamp, and determines if the received second message is valid using the value of the reboot counter. The finite state machine then outputs an accurate indication of the state of the device.

In another embodiment the invention provides a method of determining a state of a device based on a message received from the device. The method includes receiving a message from the device, the message having a first type including a reboot counter and a timestamp or a second type including the reboot counter, transitioning the state of the device from online to momentary when a valid first type message is received and a difference between the timestamp and the current time is less than a predefined time duration, transitioning the state of the device from momentary to online when a valid second type message is received, transitioning the state of the device from momentary to sustained when the difference between the timestamp and the current time exceeds a predefined time duration without receiving a valid second type message, transitioning the state of the device from sustained to momentary when a valid first type message is received and a difference between the timestamp and the current time is less than a predefined time duration, and transitioning the state of the device from sustained to online when a valid second type message is received.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
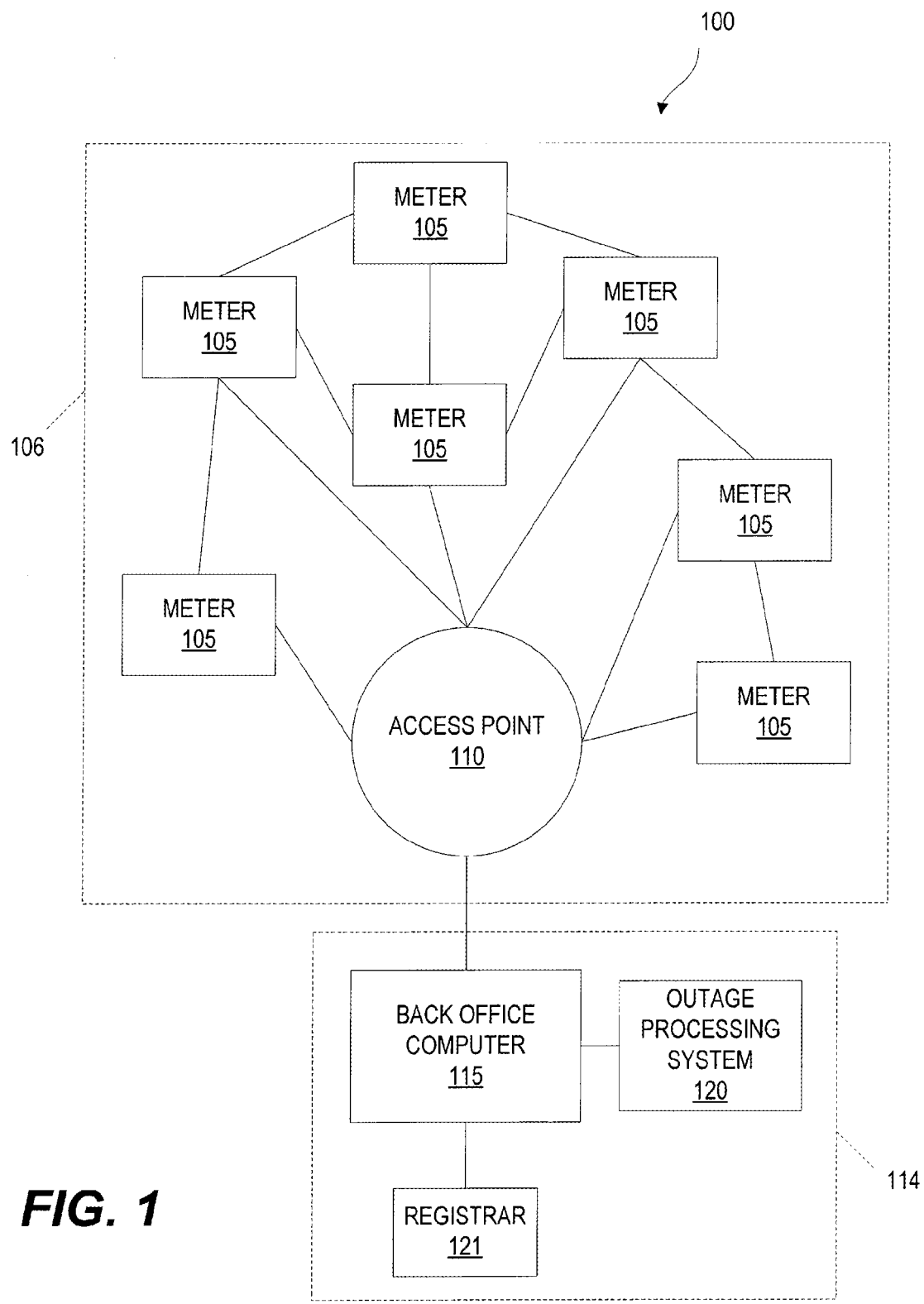
FIG. 1 is a schematic view of an outage detection system.

FIG. 1 illustrates an outage detection system 100. The outage detection system 100 includes a plurality of devices (e.g., meters) 105, a wireless mesh network 106, an access point 110, and a back office system 114. The back office system 114 includes a back office computer 115, an outage processing system 120, and a registrar 121. The back office system 114 can be one system incorporating the outage processing system 120, the registrar 121, and/or the back office computer 115, or the outage processing system 120, the registrar 121, and the back office computer 115 can all be separate systems. While reference is made herein to an electric utility and a utility grid for power distribution, it should be understood that the systems and methods described herein can also or alternatively be used with other utilities, such as, for example, water, gas, and/or other measurable and widely distributed services. In addition, the system and method can be used with other instrumented electrical devices (e.g., street lights).

Figure 2:
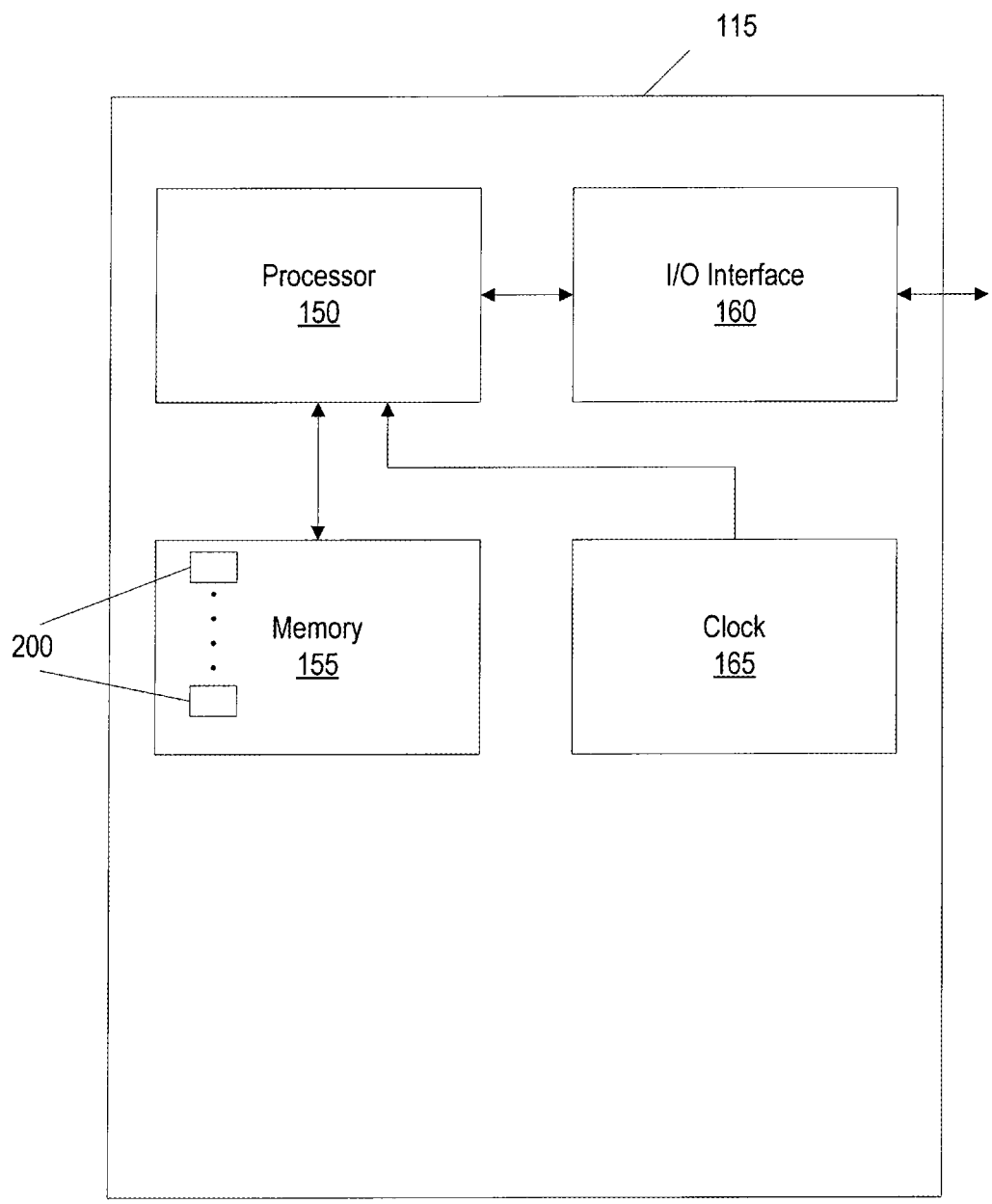
FIG. 2 is a block diagram of a back office computer of an outage detection system.

FIG. 2 illustrates the back office computer 115 of the back office system 114. The back office computer 115 includes a processor 150 (e.g., a microprocessor, microcontroller, ASIC, DSP, FPGA, etc) and memory 155 (e.g., flash, ROM, RAM, EEPROM, etc.), which can be internal to the processor 150, external to the processor 150, or a combination thereof. The memory 155 stores the software used for the outage detection system, while the processor 150 executes the stored software. The back office system 114 also includes an input/output interface 160 and a clock 165.

Referring back to FIG. 1, when a meter 105 powers on, it attempts to register with an access point 110, which will assign the meter 105 an IPv6 address and forward a registration message to the registrar 121 of the back office system 114. The outage processing system 120 receives the meter registration message containing the registration timestamp from the registrar 121 after a delay. In the embodiment shown, the registrar 121 acts as a Domain Name Server (DNS).

The back office system 114 also uses ping requests to regularly determine if a meter 105 is powered on. The back office system 114 sends a ping request to a meter 105. A positive ping response received by the back office system 114 indicates that the meter 105 is powered on. A negative ping response does not necessarily indicate that the meter 105 is powered off. A negative ping response could also mean network problems due to route instability or registration of meters 105 not yet complete or the ping request or response was dropped by the network due to congestion. Each ping response includes a timestamp.

When a meter 105 loses power, the meter 105 sends a first message indicating it has lost power to the back office computer 115 via the mesh network 106. This message is known as a last gasp message and contains a timestamp of when the last gasp message was sent. That is, the meter 105 sends the last gasp to neighboring meters 105 that still have power. The neighboring meters 105 receive the last gasp message and forward it to the access point 110. The access point 110 then forwards the message to the back office computer 115.

The back office computer 115 receives and processes the last gasp message, determining if the last gasp message is valid. Examples of invalid messages include messages received multiple times, delayed messages, etc. Once a last gasp message is determined to be valid the back office system 115 determines a state of the meter 105, and forwards the state to the outage processing system 120, the outage processing system 120 keeps track of all the meters 105 within the wireless mesh network 106.

When power is restored to a meter 105, the meter 105 sends a second message known as a restoration message to the access point 110, via the wireless mesh network 106. The access point 110 then sends the message to the back office computer 115. The back office system 114 again determines if the message is valid. Once a restoration message is determined to be valid the back office system 115 determines a state of the meter 105, and forwards the state to the outage processing system 120.

Messages are determined to be valid by using a reboot counter, timestamps of the last gasp messages, and the current time. The reboot counter indicates the number of reboots that the meter 105 has performed since installation. After each power on, the meter's reboot counter is incremented. The timestamps indicate the outage times. A last gasp message followed by a restoration message with an incremented reboot count produces a typical outage and restoration scenario. A momentary outage occurs when the time between the timestamp of a last gasp message and the current time is less than a predefined value (e.g., 5 minutes), also known as a momentary filter duration. An outage is considered a sustained outage when the time difference between the timestamp of the last gasp message and the current time is greater than the momentary filter duration. When a restoration message is received with the same or lower reboot count, the restoration message is a duplicate or is late. When a restoration message is received with a reboot count higher than expected, there are dropped or out-of-order messages.

Figure 3:
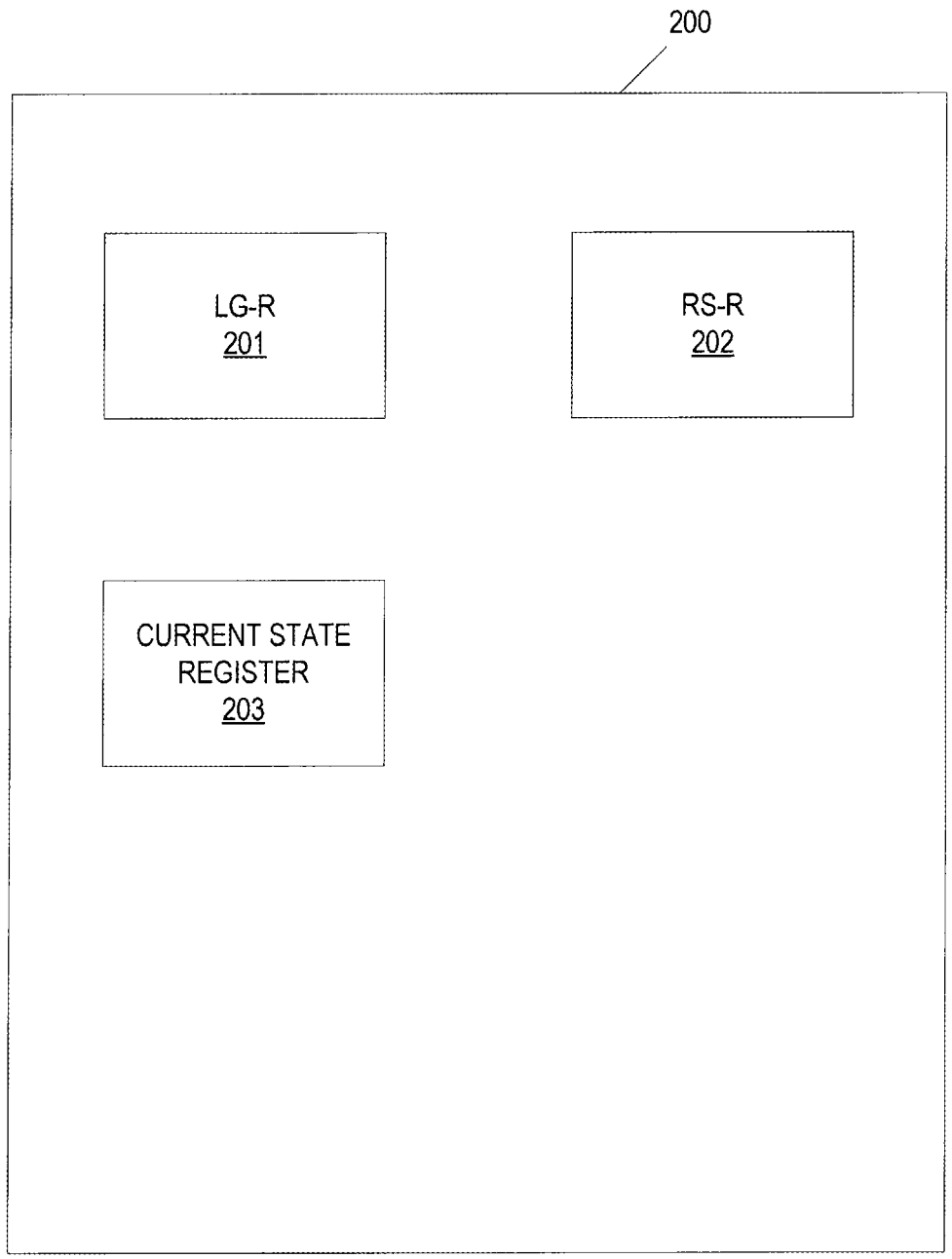
FIG. 3 is a block diagram of a finite state machine of an outage detection system.

FIG. 3 shows a Finite State Machine (FSM) 200 used to keep track of the state of the meters 105. The FSM 200 is implemented using a computer program, stored in the memory 155 and executed by the processor 150. A different FSM 200 is created for each meter 105. The back office computer 115 sends the determined state for each meter 105 to the outage processing system 120, which records the state and determines whether an outage has occurred and the extent of the outage.

The FSM 200 contains a last gasp register 201, a restoration register 202, and a current state register 203. The last gasp register 201 will only be updated when the FSM 200 receives a last gasp message with a higher reboot count then the previously received last gasp message. A last gasp message with the same or lower reboot count than the previously received last gasp message will not update the last gasp register 201. The same logic applies to the restoration register 202 for restoration messages. The clock 165 has the current time for comparison against the timestamps of the last gasp messages. The current state register 203 keeps track of the current state of the meter 105, and is updated upon the meter 105 transitioning to a new state.

Figure 4:
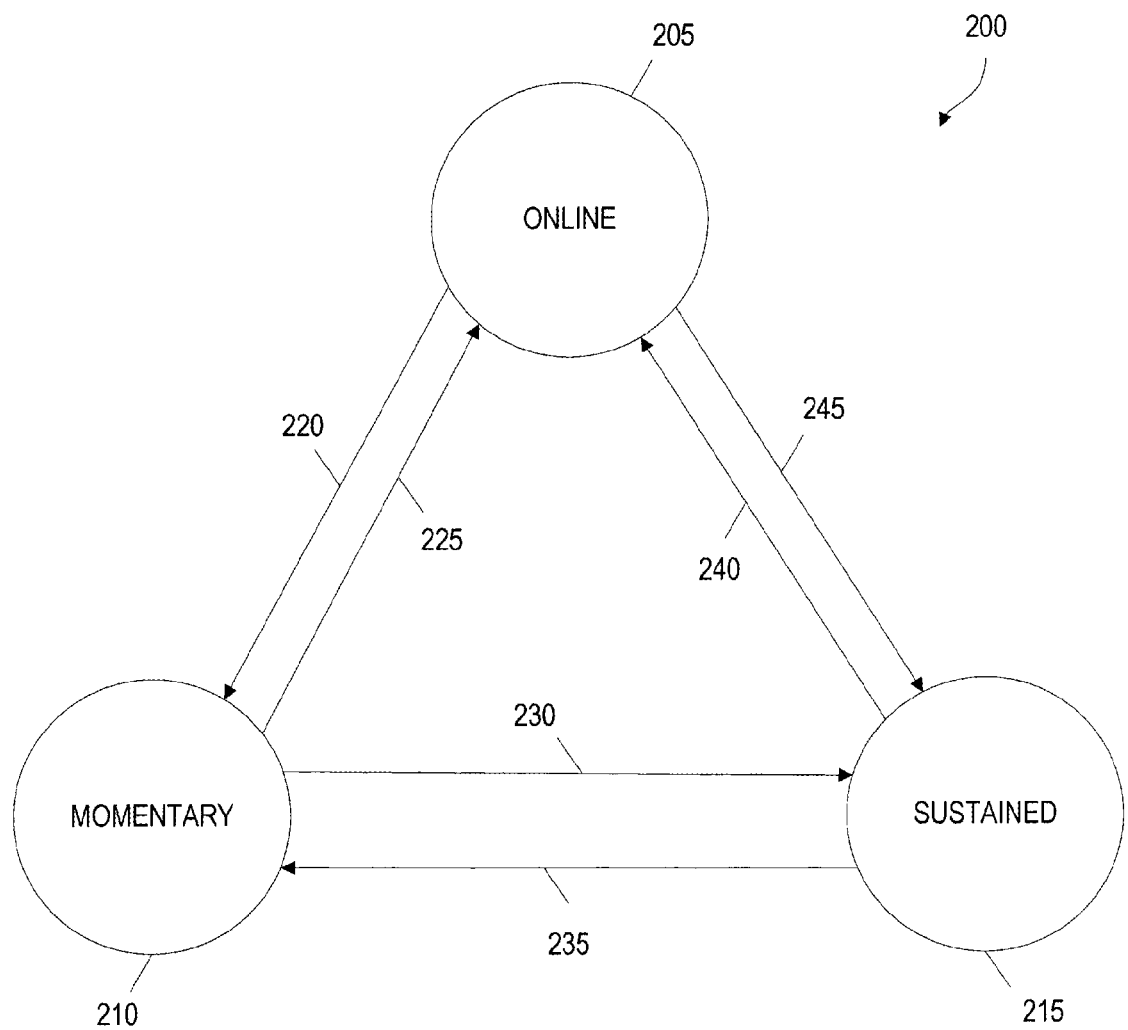
FIG. 4 is a flow chart of a finite state machine.

FIG. 4 illustrates the states of the FSM 200, including an online state 205, a momentary state 210, a sustained state 215, and the transitions from one state to another. A meter 105 is in the online state 205 if power is not lost. A meter 105 is in the momentary state 210 if the meter 105 has an outage that has not yet lasted more than the momentary filter duration. A meter 105 is in the sustained state 215 if power remains out for more than the momentary filter duration.

When the meter 105 is powered on it is in the online state 205. When a last gasp message with a reboot count greater or equal to the restoration register 202 is received by the back office system 114, the meter 105 transitions to the momentary state 210 if the difference between the timestamp of the received last gasp message and the current time is less than a predefined time period (i.e., a momentary filter duration) (transition 220). If a restoration message with a reboot count greater than the last gasp register 201 is received by the back office system 114, the meter 105 transitions from the momentary state 210 back to the online state 205 (transition 225).

When the meter 105 is in the momentary state 210, a transition to the online state 205 occurs when a DNS registration message, or a ping response from the meter 105, has a timestamp more recent than the timestamp of the most recent valid last gasp message (transition 225). When the meter 105 is in the momentary state 210, a transition to the sustained state 215 occurs when the difference between the timestamp of the most recent valid last gasp message and the current time is greater than the momentary filter duration (transition 230). The meter 105 transitions from the sustained state 215 back to the momentary state 210 if a new last gasp message with a reboot count greater than the last gasp register 201 is received and the momentary filter duration has not yet occurred (transition 235).

When the meter 105 is in the sustained state 215, a transition to the online state 205 occurs when a restoration message with a reboot count greater than the last gasp register 201 is received (transition 240). When the meter 105 is in the sustained state 215, a transition to the online state 205 also occurs when a DNS registration message, or a ping response from the meter 105, is received with a timestamp more recent than the timestamp of the most recent valid last gasp message (transition 240).

When the meter 105 is in the online state 205, a transition to the sustained state 215 occurs when a last gasp message with a reboot count greater than or equal to the restoration register 202 is received having a difference between the timestamp of the message received and the current time greater than the momentary filter duration (transition 245).

Scenarios occur that do not change the current state of the meter 105. If the current state is the online state 205, the meter 105 will stay in the online state if a last gasp message is received having a reboot count less than the previous restoration register 202. The meter 105 will also stay in the online state 205 if a new restoration message is received.

If the current state is the momentary state 210, the meter 105 stays in the momentary state 210 if a last gasp message having a reboot count greater than the last gasp register 201 is received and the difference between the timestamp of the message and the current time is less than the momentary filter duration. The meter 105 also stays in the momentary state 210 when a last gasp message having a reboot count less than or equal to the last gasp register 201 is received. The meter 105 also stays in the momentary state 210 when a restoration message is received with a reboot count less than or equal to the last gasp register 201.

If the current state is the sustained state 215, the meter 105 stays in the sustained state 215 if a last gasp message is received with a reboot count greater than the last gasp register 201, and the difference between the timestamp of the message and the current time is greater than the momentary filter duration. The meter 105 stays in the sustained state 215 if a last gasp message is received with a reboot count less than or equal to the last gasp register 201. The meter 105 stays in the sustained state 215 if a restoration message is received with a reboot count less than or equal to the last gasp register 201.

The table below illustrates the start state, end state, triggering event, and the corresponding transitions of FIG. 4, as described above. The triggering event is represented in Boolean language, using last gasp message (LG), restoration message (RS), last gasp register (LG_R), restoration register (RS_R), and momentary filter duration (MF). For example, transition 220, having an online start state and momentary end state, has a triggering event of LG(>=RS_R &&<MF). This means that the state will transition from the online state 205 to the momentary state 210 when a last gasp message (LG) is received that has a reboot count greater than or equal to the registration register 202 (RS_R), and the last gasp message (LG) has a time difference between the timestamp of the message and the current time that is less than the momentary filter duration (MF).

| Start State | End State | Triggering Event | Transition |
|---|---|---|---|
| Online | Momentary | LG(>=RS_R && <MF) | Transition 220 |
| Online | Online | LG < RS_R | No Transition |
| Online | Online | RS <= RS_R | No Transition |
| Online | Online | RS > RS_R | No Transition |
| Online | Sustained | LG(>=RS_R && >MF) | Transition 245 |
| Momentary | Online | RS > LG_R | Transition 225 |
| Momentary | Online | Meter registration timestamp more recent that most recent valid last gasp message timestamp | Transition 225 |
| Momentary | Online | Ping response timestamp more recent that most recent valid last gasp message timestamp | Transition 225 |
| Momentary | Momentary | RS <= LG_R | No Transition |
| Momentary | Momentary | LG <= LG_R | No Transition |
| Momentary | Momentary | LG(>LG_R && <MF) | No Transition |
| Momentary | Sustained | LG > MF | Transition 230 |
| Sustained | Online | RS > LG_R | Transition 240 |
| Sustained | Online | Meter registration timestamp more recent that most recent valid last gasp message timestamp | Transition 240 |
| Sustained | Online | Ping response timestamp more recent that most recent valid last gasp message timestamp | Transition 240 |
| Sustained | Momentary | LG(>LG_R && <MF) | Transition 235 |
| Sustained | Sustained | LG <= LG_R | No Transition |
| Sustained | Sustained | RS <= LG_R | No Transition |
| Sustained | Sustained | LG(>LG_R && >MF) | No Transition |

Thus, the invention provides, among other things, a system and method for monitoring smart grid power outages and restorations under adverse network conditions in which messages may be dropped, arrive out-of-order, or duplicated. Various features and advantages of the invention are set forth in the following claims.

What is claimed is:

1. A power outage detection system, the system comprising:
   a device configured to:
      increment a reboot counter when the device is powered up, and
      transmit a first message when the device loses power and a second message when the device is powered up, the first message including the value of the reboot counter and a timestamp, the second message including the value of the reboot counter; and
   a back office system including a finite state machine configured to:
      receive the first and second messages,
      determine if the received first message is valid based on the value of the reboot counter and the timestamp,
      determine if the received second message is valid based on the value of the reboot counter, and
      output an accurate indication of the state of the device.

2. The power outage detection system of claim 1, wherein the finite state machine is further configured to:
   save the value of the reboot counter,
   determine that a received first message is valid when the value of the reboot counter in the received first message is equal to or greater than the saved reboot counter value, and
   determine that a received second message is valid when the value of the reboot counter in the received second message is greater than the saved reboot counter value.

3. The power outage detection system of claim 1, further comprising an outage processing system configured to receive an indication of the state of the device from the finite state machine, and to track the states of a plurality of devices.

4. The power outage detection system as set forth in claim 1, wherein the device transmits the first and second messages to the back office system via a wireless mesh network.

5. The power outage detection system as set forth in claim 1, further comprising a domain name system server, the device registering with the domain name server when the device is powered up.

6. The power outage detection system as set forth in claim 1, further comprising the back office system pinging the device, the device responding to the ping when the device is powered on.

7. The power outage detection system of claim 1, wherein the state of the device is determined to be an online state when power to the device is not lost, a momentary state when there is a power outage that has not lasted longer than a predefined time duration, or a sustained state when there has been a power outage for more than the predefined time duration.

8. The power outage detection system of claim 7, wherein the finite state machine transitions from the online state to the momentary state when a valid first message is received and a difference between the timestamp and the current time is less than the predefined time duration.

9. The power outage detection system of claim 7, wherein the finite state machine transitions from the momentary state to the online state when a valid second message is received.

10. The power outage detection system of claim 7, wherein the finite state machine transitions from the momentary state to the sustained state when the difference between the timestamp and the current time exceeds the predefined time duration without receiving a valid second message.

11. The power outage detection system of claim 7, wherein the finite state machine transitions from the sustained state to the momentary state when a valid first message is received and a difference between the timestamp and the current time is less than the predefined time duration.

12. The power outage detection system of claim 7, wherein the finite state machine transitions from the sustained state to the online state when a valid second message is received.

13. The power outage detection system of claim 7, wherein the finite state machine transitions to the online state of the device when the timestamp of a registration message is more recent than the timestamp of a valid first message.

14. A method of determining a state of a device based on a message received from the device, the method comprising:
receiving a message from the device, the message having a first type including a reboot counter and a timestamp or a second type including the reboot counter;
transitioning the state of the device, via a processor, from online to momentary when a valid first type message is received and a difference between the timestamp and the current time is less than a predefined time duration;
transitioning the state of the device from momentary to online when a valid second type message is received;
transitioning the state of the device from momentary to sustained when the difference between the timestamp and the current time exceeds a predefined time duration without receiving a valid second type message;
transitioning the state of the device from sustained to momentary when a valid first type message is received and a difference between the timestamp and the current time is less than a predefined time duration; and
transitioning the state of the device from sustained to online when a valid second type message is received.

15. The method as set forth in claim 14, further comprising:
determining that a first type message is valid when the received reboot counter is greater than or equal to a stored reboot counter; and
determining that a second type message is valid when the received reboot counter is greater than the stored reboot counter.

16. The method as set forth in claim 14, further comprising transitioning the state of the device to online when a ping response is received with a timestamp more recent than the timestamp of a received valid first type message.

17. The method as set forth in claim 14, further comprising receiving an indication of the state of the device at an outage processing system, the outage processing system configured to track the states of a plurality of devices.

18. The method as set forth in claim 14, wherein the message is received via a wireless mesh network.

19. The method as set forth in claim 14, further comprising registering, by the device, with a domain name system server when the device is powered up.

20. The method as set forth in claim 14, further comprising incrementing the reboot counter upon power up.

* * * * *